United States Patent
Sanjeevaiah Krishnaiah

(10) Patent No.: US 11,776,040 B2
(45) Date of Patent: Oct. 3, 2023

(54) SYSTEM, METHOD, AND MEDIUM FOR USER SPECIFIC DATA DISTRIBUTION OF CROWD-SOURCED DATA

(71) Applicant: PAYPAL, INC., San Jose, CA (US)

(72) Inventor: Akshay Sanjeevaiah Krishnaiah, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 192 days.

(21) Appl. No.: 17/317,186

(22) Filed: May 11, 2021

(65) Prior Publication Data

US 2021/0272179 A1    Sep. 2, 2021

Related U.S. Application Data

(63) Continuation of application No. 15/789,826, filed on Oct. 20, 2017, now Pat. No. 11,004,136.

(60) Provisional application No. 62/411,479, filed on Oct. 21, 2016.

(51) Int. Cl.
| | |
|---|---|
| *G06Q 30/00* | (2023.01) |
| *G06Q 30/0601* | (2023.01) |
| *G06Q 50/00* | (2012.01) |
| *G06F 16/9535* | (2019.01) |

(52) U.S. Cl.
CPC ..... *G06Q 30/0631* (2013.01); *G06F 16/9535* (2019.01); *G06Q 50/01* (2013.01)

(58) Field of Classification Search
CPC . G06Q 30/0631; G06Q 50/01; G06F 16/9535
See application file for complete search history.

(56) References Cited

U.S. PATENT DOCUMENTS

| | | | |
|---|---|---|---|
| 6,405,175 B1 * | 6/2002 | Ng | G06Q 30/02 705/400 |
| 7,664,669 B1 * | 2/2010 | Adams | G06Q 30/0633 705/7.32 |
| 9,904,445 B2 * | 2/2018 | Lian | G06F 3/04842 |

(Continued)

OTHER PUBLICATIONS

Aris, Hazleen, and Marina Md Din. "On using mobile crowdsourcing for timely information solicitation and sharing of prices." 2014 9th International Conference on Software Engineering and Applications (ICSOFT-EA). IEEE. (Year: 2014).*

(Continued)

*Primary Examiner* — Matthew E Zimmerman
(74) *Attorney, Agent, or Firm* — Haynes and Boone, LLP

(57) ABSTRACT

There are provided systems and methods for user specific data distribution of crowd-sourced data. A user may provide data indicative of an item the user may wish to purchase, for example, through browsing history, entry of the item to a transaction, or other information. A community of users associated with the user, which may include the user or other known or nearby users, may provide real-time data collected by their devices of information that may be relevant to purchase of the item. The information may be passively or actively collected by components of devices for their devices, and may be crowd-sourced so that the community of users may elect to release the information and receive rewards by virtue of their data sharing. The information may be processed to determine a recommendation for purchase, which may be output through a commonly used communication platform for the user.

20 Claims, 5 Drawing Sheets

(56) References Cited

U.S. PATENT DOCUMENTS

| | | | |
|---|---|---|---|
| 2002/0004812 A1* | 1/2002 | Motoyama | H04L 12/5692 |
| | | | 709/201 |
| 2004/0093274 A1* | 5/2004 | Vanska | G06Q 30/0631 |
| | | | 705/26.7 |
| 2012/0123673 A1* | 5/2012 | Perks | G06Q 30/0625 |
| | | | 705/26.7 |
| 2013/0218721 A1* | 8/2013 | Borhan | G06Q 30/0238 |
| | | | 705/26.41 |
| 2015/0106236 A1* | 4/2015 | Morris | G06Q 30/0629 |
| | | | 705/26.64 |

OTHER PUBLICATIONS

Haddadi H., et al., "Targeted Advertising on the Handset: Privacy and Security Challenges." Pervasive advertising, Springer, London, 2011, pp. 119-137.

* cited by examiner

SYSTEM, METHOD, AND MEDIUM FOR USER SPECIFIC DATA DISTRIBUTION OF CROWD-SOURCED DATA

CROSS-REFERENCE TO RELATED APPLICATIONS

This application is a continuation of U.S. application Ser. No. 15/789,826, filed Oct. 20, 2017, which claims benefit to U.S. Provisional Application No. 62/411,479, filed Oct. 21, 2016, all of which is hereby incorporated by reference in its entirety.

TECHNICAL FIELD

The present application generally relates to intelligent data processing based on crowd sourced data and, and more specifically to distributing crowd-sourced data from one or more devices to provide user specific information and recommendations through a preferred electronic communication platform.

BACKGROUND

Consumers engaging in everyday shopping may face a multitude of different problems that may cause unnecessary issues for the consumers. For example, a consumer may not have real-time pricing and/or availability information, and may further run into unnecessary time wasting events, including lines, traffic, parking issues, and/or unforeseen events. Thus, shopping for groceries or other common items needed by consumers may deter consumers from purchases or may cause the consumers to purchase suboptimal items based on price, availability, and/or brand. Moreover, other consumers that have found optimal items for certain purchasing behaviors may spend an inordinate amount of time performing such research and may have no incentive to assist other consumers in shopping.

Service providers may provide different services to consumers, including services related to shopping and/or purchasing of items. Such services may be provided to consumers through input processing procedures that assist the service provider in receiving input from the consumer and providing the consumer with the requested features. Consumers performing everyday shopping may wish to utilize the service provider features; however, the service provider may not have real-time data necessary to serve the consumer's interests and may be unaware of how to best present data to the consumer to assist the consumer in shopping. For example, an online merchant marketplace and/or item search engine may only have information stored to a database, which may be outdated, or may only have static data that does not reflect real-world changes to inventory, pricing, or other relevant data. Other service providers that interact with merchant devices to receive data may only be aware of data entered to the merchant device, which may not reflect other available data at a location or another merchant location. Thus, online services providers are unable to convey up-to-date information to user devices on a network, such as mobile smart phones, in a relevant and useful manner, which may disadvantage both the merchant and the consumer for on-line or web based or related transactions.

Figure 1:
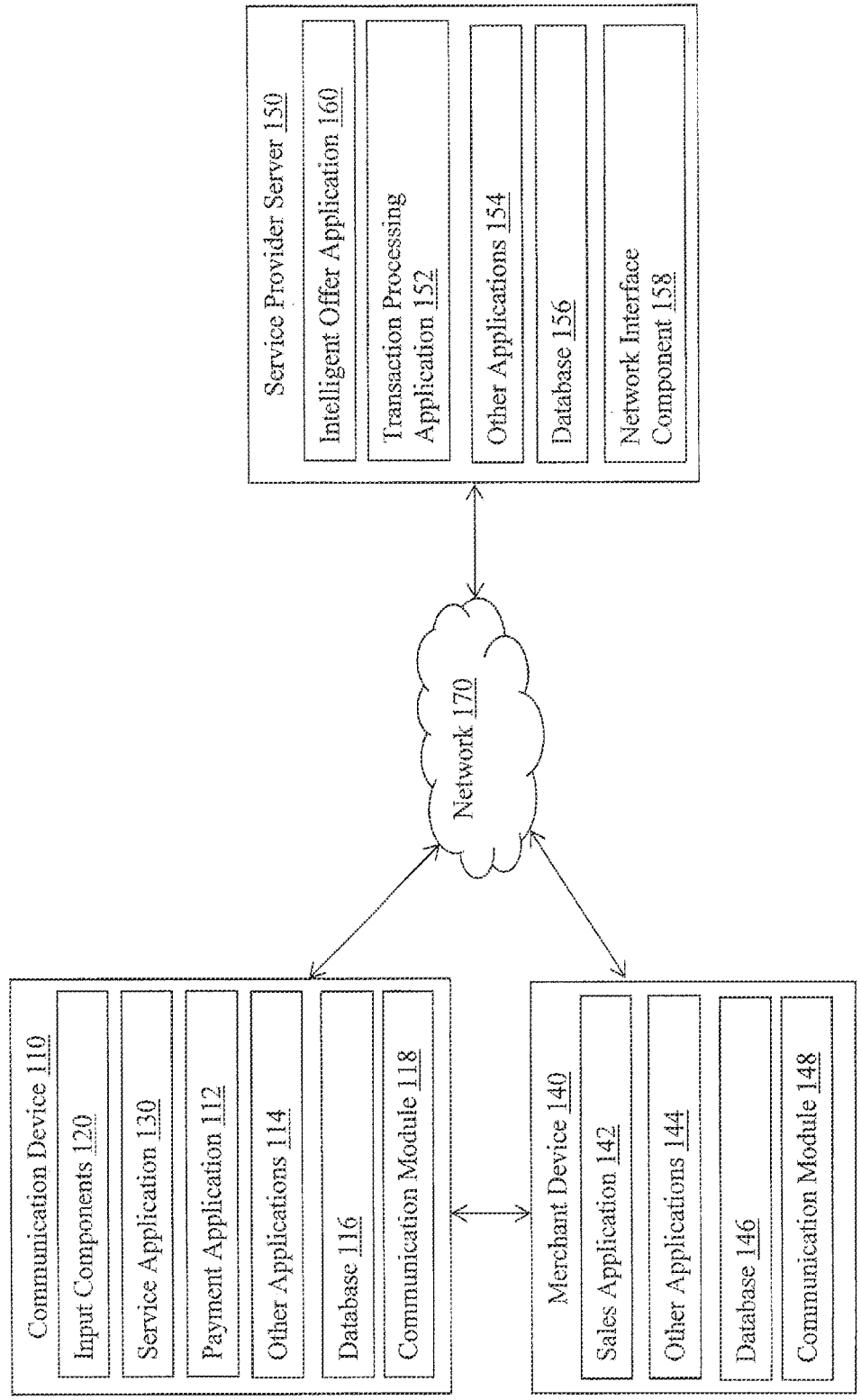
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for user specific data distribution of crowd-sourced data. Systems suitable for practicing methods of the present disclosure are also provided.

A service provider, such as a transaction processor service, may provide different online services to a user that assist the user in processing one or more transactions, as well as providing data to the user including data associated with one or more items available for purchase from one or more merchants. For example, the service provider may provide tokenization services that tokenize secure or sensitive data (e.g., a payment instrument, authentication credentials, and/or account identifier allowing for processing of payments) by substituting the data for a token or another identifier or data element having no external meaning but referring back to the data through a tokenization system. Thus, the token may further identify a digital wallet or other account feature with the service provider to allow payments to be processed. In further embodiments, the service provider may provide risk and/or fraud analysis procedures for transaction processing and user/merchant identification and security, gateway payment processing services to process payments using payment instruments (e.g., debit/credit cards, payment accounts, gift cards, etc.), peer to peer payments, micro-transaction platforms including in-app micro-transactions for purchases, rewards and incentives including exchange services for rewards/incentives, user addition or removal, and/or online account and digital wallet services. The service provider's services may be exposed through one or more application programming interfaces (APIs) associated with the processes and components providing the services of the service provider. The services may also be added, removed, and/or changed from an application or accessible platform as needed by the requirements of one or more users utilizing such features.

Such services may make up a foundation layer of the service provider, where the services are provided through additional layers, for example, natural language processing, machine learning, and/or artificial intelligence processes and features that assist the service provider in processing data and combining the services to process data from users and provide data and/or the services back to the user. The data processing techniques and features of the service provider may receive data, including real-time data crowd-sourced from multiple users, merchants, and/or other entities, in order to process, store, and/or service the data to additional users. Thus, the data processing features may determine how to collect data, what data to collect, how the data relates to other received and/or stored data, and what data to provide to particular users. As previously discussed, the data may include data associated with one or items available for purchase from one or more merchants, including the same or similar item available from multiple merchants (e.g., a store selling the same food item, product, etc.). Thus, the item data may include real-time pricing, availability, reviews, purchase patterns (e.g., indicators of future availability or pricing), discounts/incentives, and/or other item information. Crowd-sourced information for one or more items may also include user knowledge and/or postings shared by other users, including specific knowledge by certain users that may indicate an item's price, availability, and/or use for a task or requirement. Further environmental data may also be accrued by the service provider, including weather information associated with the user's and/or merchant's location, traffic patterns and congestion, routing and mapping information, user population information at a location including current line wait times at a shopping location, parking information and pricing, public transportation schedules, and/or other external environmental factors and/or information associated with a user, merchant, and/or location. Such data may be crowd-sourced from a community of users at a location, purchasing a product, or otherwise associated with a product or merchant. For example, the service provider may request or receive contributions from a plurality of users in a community related to the item, merchant, and/or environmental factors, such that data accrual is outsourced to or obtained from the crowd of users. Additionally, the data may be received from other entities, such as traffic reporting services, weather services, and/or other types of data providing resources. Moreover, such item and/or environmental data may also be retrieved through sensors and/or data accrual devices embedded in everyday devices, for example, through electronics, software, and network connectivity of devices linked through the Internet of Things (IoT).

Additionally, for the service provider to receive real-time crowd-sourced data from users, the service provider may incentivize one or more other users to share data required by the service provider's services. For example, an incentive may be unlocked or received based on a user sharing data such that the incentive is not received by the user unless the user performs an affirmative act to provide item and/or environmental data to the service provider. An incentive may be unlocked by the user entering data that is transmitted to the service provider, which may include text, images, video, audio, or other digital content that may be processed by the service provider. The relevancy, timeliness, and/or accuracy of the data may influence the type of reward received, such that more specific or relevant data provides better rewards or more of a reward. Thus, the reward system may function as a game or other tiered or scored activity that allows the user to progress through ranks or levels to unlock content, including the rewards and other benefits. Additionally, the reward system may be tiered so that the user may join higher tiers having better benefits, and may also provide the user with further benefits, including social networking recognition, video game bonuses, application features, service provider feature benefits, and/or titles or badges. For example, an additional benefit or reward system level that provides benefits may be unlocked after a number of shares of information or capture and transmission of information to the service provider. In other embodiments, the information may be indirectly shared with the service provider and retrieved using another source. In such embodiments, the service provider may provide the reward after scraping (e.g., web or application scraping, such as web harvesting or data extraction) the data from one or more sources, including online postings, social networking feeds, microblogging entries, media shares, messages, texts, voice data transfers, or other data transmission. Additionally, incentives may be provided for the user purchasing an item and/or user shopping at the location based on provided recommendations by the service provider for sharing their purchasing/shopping data, as discussed herein. The reward may also be presented in an augmented reality, for example, nearby or over an item where the service provider would like information. Users may then unlock the reward by capturing item data and transmitting the item data to the service provider.

Thus, the service provider may request and/or receive the data from one or more other users, merchants, and/or entities, including requesting and/or receive the data in real-time so that the data is current for the items. The service provider may also request and/or receive data for a particular user interested in an item, including real-time data for the user. The user data may include a location of the user, item interest (e.g., a shopping list, purchase preference, item requirement, or other indication of a potential purchase by the user), schedule of the user, upcoming appointments or locations of visit by the user, travel or transportation availability/usage by the user, current available funds of the user, device application usage, or other information used to determine where, when, or how much to purchase an item, for example, user purchasing preferences of the user.

In order to provide relevant data and item shopping recommendations to the user based on the crowd-sourced item and environmental data, an item of interest of the user may be determined by the service provider. The item of interest may be determined based on the user data, such as a shopping list, interests, preferences, past purchases, purchase preference, and/or item requirement. Moreover, the service provider may determine a matching item to the item of interest, where the matching item is available for purchase from a merchant. Thus, the matching item may be a specific item (or group of items depending on availability and/or selection differences) available from a specifically selected merchant or group of merchants, which may include a specific merchant location and/or merchant locations for the group of merchants. The matching item may be determined based on the crowd-sourced item and/or environmental data such that the price, availability, convenience, and/or other purchasing factor is determined for the particular user based on the user data for that user. For example, where a budget is the most important, a lowest priced matching item may be selected, which may also consider cost to retrieve the item (e.g., used gas for a vehicle to travel to the merchant location, public transportation cost, etc.). In other embodiments, the availability may influence selection of a matching item, for example, based on inventory, seasonal pricing/availability, or other availability data for an item. Similarly, the convenience may affect selection of the matching item for users where time may be a factor (e.g., a set lunch break schedule or upcoming meeting). Environmental data may also influence selection of the matching item, for example, by selecting a most convenient merchant (e.g., a merchant with the shortest lines, most parking availability, shortest route, least traffic to visit, etc.) and/or lowest cost merchant (e.g., factoring in parking cost, travel cost based on traffic, etc.). Utilizing the user data with the item and environmental data, a shopping/purchase recommendation for one or more items may be determined, which may include a specific price, location of purchase, merchant, and/or other necessary purchase information. In various embodiments, the recommendation may include further information in addition to a purchase price, location, and/or availability, including a route to purchase the item, a time for purchase of the item, a schedule to visit a merchant location selling the item, parking locations for parking to purchase the item, and/or other information that may be of use to the user when purchasing the item and/or shopping for the item.

The service provider may provide an additional layer of components utilized for the presentation of data to users, which may interact directly with one or more other devices or servers to communicate relevant data to particular users, such as the shopping/purchase recommendations. For example, such components of the service provider may interface with one or more applications, including dedicated device-side applications and/or website hosting applications to serve data to a user through one or more protocols or interfaces. Such components may include multiple different types of experiences for users to receive and consume data, such as media including the recommendations determined by the service provider. The service provider may use user data, including data for communication platforms used or preferred by the user, to select a communication platform that the service provider may utilize to communicate the recommendation to the user. The service provider may utilize the aforementioned components to access the communication platform and transmit the recommendation, such as an online messaging platform, social networking service, email service, microblogging service, media sharing service, or other online portal. The communication platform may also be device specific or correspond to a specific device, include a personal computer, tablet, mobile phone, smart home device, voice activate device, vehicle computing platform (e.g., console device and/or heads up display), and/or other device.

The user may select a communication platform that the user wishes to receive the recommendation. However, in other embodiments, the communication platform may be determined based on past user actions including use of platforms, available platforms to the user, and/or viewing history by the user. The communication platform may also be selected based on the recommendation and/or when the recommendation should be transmitted, for example, if the recommendation is for a certain location (e.g., near home, and thus provided through a smart home system or voice activated home device) and/or will be presented at a certain time (e.g., on a walk by the user, and thus through a communication platform available to a mobile phone). Thus, the service provider may further determine when to communicate the recommendation to the user, which may be based on a time most likely to be viewed on the communication platform and/or selected based on the user's location or schedule. For example, the recommendation may be presented while the user is viewing the platform, when the user is nearby the merchant location, or when the user has time in their schedule to visit the merchant location (e.g., between appointments). Once the platform is determined by the service provider, the recommendation may be communicated to the user for viewing and/or using while shopping.

Moreover, the recommendation for the purchase of the item and/or the shopping list, route, or other information provided in the recommendation may be updated in real-time based on changing real-time data received from the crowd-sourced users and/or detected for the user. For example, as new item data is updated, the recommendation for the particular matching item may be updated, and the service provider may further generate an additional or new recommendation better suited for the user's interests, preferences, and/or user data. The new item data may correspond to changes in item pricing and/or availability, or may correspond to other data relevant to the user, such as other users' reviews (e.g., bad/good reviews of an item). Moreover, the environmental data may affect the recommendation and/or may cause generation of a new recommendation, for example, based on traffic, weather, parking, or other factors.

In further embodiments, the recommendation may be updated based on detected user information, including a location of the user. For example, a map route to locate the item and/or merchant location may be updated based on a location of the user and/or environmental data. Moreover, an in-store route may be updated using proximity wireless beacon devices or "nearables" (e.g., smart devices having sensors and/or transmitters to send and/or receive data within a proximity, for example, to a user's mobile device) to assist the user in locating the device and instructing the user to the device, as well as provide the status of the device. Additionally, an augmented reality may be presented to the user, for example, through captured audiovisual data, that may assist the user in routing to the merchant location and/or to the item, as well as display item information, environmental data, and/or incentives. Thus, rewards for shopping may also be provided through the augmented reality, where the user may accrue a reward through shopping and/or purchasing, as well as sharing data. Moreover, a user purchasing an item may further be incentivized to share data after purchasing or viewing an item through the aforementioned purchase plan.

The service provider may further provide a digital wallet to the user, where the digital wallet may include one or more financial instruments that the user may use during transaction processing. Thus, the service provider may further include additional transaction management services, as well as account services for use with the service provider and accessible through a device application, such as a browser application, dedicated application of the service provider, and/or other application (e.g., merchant application) utilizing the processes and features provided by the service provider. Accounts with the service provider may correspond to a digital wallet, as well as a payment account, where a holder of the account may send and receive payments and engage in transaction processing. For example, payment accounts with a payment provider may allow the user to send and receive money for transactions, transfers, and other financial actions. The accounts of users may include personal, device, and financial information, as well as other information that may be determined by or requested from the service provider. Additionally, the user may specify authentication credentials, such as a login name, password, and/or personal identification number (PIN) for use of the account. Thus, the user may be allowed to use the digital wallet as a payment instrument in further transaction processing. For example, the user may use the digital wallet for a purchase with another seller or merchant. The user may utilize the digital wallet to effectuate a purchase prior to arriving at a merchant location and/or at a merchant location, for example, through the recommendation provided to the user. In this regard, the recommendation may include a purchase option and process that allows the user to purchase the matching item in the recommendation. Thus, the recommendation may close the shopping loop by allowing the user to further complete a purchase for the item. Where the item is purchased prior to arrival at the merchant location, the processed transaction history may be transmitted to the user and/or the merchant, and the merchant may be provided with instructions for holding the item and/or having the item delivered to the user.

Thus, utilizing the aforementioned procedures, APIs of one or more services provided by an online service provider may be more appropriately put together and utilized in a convenient application package to provide services beneficial to the user. The service provider may provide such services through real-time collection of data by crowd-sourcing data accrual to one or more other users through their user devices. Moreover, an incentive program may be established for the uploading and transmission of data, which may further be accessed through a device application, gaming process, and/or augmented reality. Moreover, issues related to the lack of accurate real-time data necessary for users to make purchasing decisions may be remedied through the use of the service provider services and accrual of real-time data. Thus, previous systems that utilized static data from single sources may be improved by accruing real-time crowd sourced data from multiple devices to provide accurate and relevant output communications to a user's device.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110, a merchant device 140, and a service provider server 150, in communication over a network 170. A user (not shown) may utilize communication device 110 to engage in a transaction with a merchant (not shown) through merchant device 140. Additionally, the user may provide data crowd-sourced from multiple users by service provider server 150 using communication device 110. In this regard, service provider server 150 may receive crowd-sourced data from multiple users and other entities, including additional sensors, computing devices, and/or networked servers and databases. The crowd-sourced data may be used by service provider server 150 with user data to determine a recommendation for a user, for example, by optimizing one or more purchasing criteria, parameters, or preferences of the user when purchasing one or more items from the merchant associated with merchant device 140. The recommendation may be communicated to the user through communication device 110 by selecting one or more communication platforms used to transmit the recommendation. Moreover, service provider server 150 may provide rewards to incentivize crowd-sourced users to release and/or provide data to service provider server 150.

Communication device 110, merchant device 140, and service provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Communication device 110 may be implemented as a communication device that may utilize appropriate hardware and software configured for wired and/or wireless communication with merchant device 140 and/or service provider server 150. For example, in one embodiment, communication device 110 may be implemented as a personal computer (PC), a smart phone, laptop/tablet computer, wristwatch with appropriate computer hardware resources, eyeglasses with appropriate computer hardware (e.g. GOOGLE GLASS @), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110 of FIG. 1 contains input components 120, a service application 130, a payment application 112, other applications 114, a database 116, and a communication module 118. Payment application 112 and other applications 114 may correspond to executable processes, procedures, and/or applications with associated hardware. In other embodiments, communication device 110 may include additional or different modules having specialized hardware and/or software as required.

Input components 120 may correspond to one or more hardware components utilized for the detection and collection of data transmitted to service provider server 150, where service provider server 150 may crowd-source the data collection to a plurality of devices including communication device 110 having the same or similar hardware features to input components 120. In this regard, input components 120 may detect item data for one or more items for sale from one or more merchants, including an item for sale from the merchant associated with merchant device 140. The item data may correspond to current or real-time data associated with the item, including an item price with the merchant, availability from the merchant, sales data and patterns for the item from the merchant, and/or other data necessary for determination of a recommendation for purchase of the item based on one or more user interests and/or preferences. Input components 120 may also be utilized to detect and/or collect environmental data associated with the user, the merchant selling the item, and/or the specific item, which may include weather information, purchase/line wait times, parking costs and/or availability, traffic conditions arriving to or departing from a merchant location (which may be route specific, for example, on certain streets), and/or conditions that may affect the price, availability, or other parameter of the item. Input components 120 may be utilized to collect user data associated with the user for determination of an item of interest, a recommendation, and/or a communication platform used to transmit a recommendation to the user. For example, the user data may indicate an item the user may wish to purchase through a shopping list, preference, search history, and/or prior purchase history. The user data may also indicate a user's preferences in purchases, such as a price preference, required inventory/amount, time of purchase, schedule of locations or appointments, and/or other preference in shopping for the item. Moreover, the user data may indicate communication platforms that the user utilizes and/or will view, as well as times of viewing and/or availability. However, in other embodiments, the user data may be provided by the user associated with communication device 110 to service provider server 150 through another input mechanism and/or may be determined by service provider server 150 using stored data for the user (e.g., transaction histories, past purchases, known preferences, shopping/wish lists, etc.).

In various embodiments input components 120 may actively be utilized to input data that may be transmitted to service provider serer 150, such as text data through a keyboard or touchscreen, media content through a camera or microphone, or other type of active input by a user. However, in further embodiments, input components 120 may passively collect data transmitted to service provider server 150, including item and/or environmental data through a GPS locator, sensor, or other input device that may be capable of passively collecting data without active user input. Moreover, input components 120 may collect data from one or more other applications executing on communication device 110, such as service application 130 and/or payment application 112, where the application data may be communicated to service provider server 150 as user data (e.g., application usage), item data (e.g., a transaction history purchasing an item or an online posting about an item), and/or environmental data (e.g., a location, traffic condition, weather, etc.).

Service application 130 may correspond to one or more processes to execute software modules and associated devices of communication device 110 to provide an application and one or more graphical user interfaces that may be utilized to send and receive communications through a communication platform, which may include receipt of recommendations from service provider server 150 to shop for and/or purchase an item of interest to the user. In this regard, service application 130 may correspond to specialized hardware and/or software utilized by a user of communication device 110 to access a communication platform, which may correspond to a platform for messaging, email, social networking, microblogging, video game, media sharing, or other type of online electronic communication. Service application 130 may receive communications, which may include communications from other entities (e.g., messages, posts, etc.) and/or recommendations from service provider server 150. Additionally, service application 130 may transmit communications to one or more other entities, including merchant device 140 and/or service provider server 150. Service application 130 may display a recommendation to the user through the communication platform associated with service application 130 and/or selected by service provider server 150. The recommendation may be output to the user based on a triggering condition, which may be detected by service application 130 and/or service provider server 150, such as a time, location, and/or action by the user. The recommendation may be displayed generally as a communication and/or through an augmented reality or other mixed content type output, for example, when displaying a route, instructions, and/or information for purchase of an item. The recommendation may also be updated in real-time based on changes to data and/or updates to routing instructions or information received from proximity beacon devices and other short range wireless communications. In various embodiments, input components 120 and/or service application 130 may transmit data requested by service provider server 150 associated with an item or environment for an item, for example when crowd-sourced from multiple resources. The data may be utilized by service provider server 150 in generating recommendations for one or more users, as discussed herein. In various embodiments, service application 130 may further provide an interface to receive rewards for sharing of data, which may include tiered rewards as well as an interactive game and/or augmented reality associated with a rewards system.

Payment application 112 may correspond to one or more processes to execute software modules and associated devices of communication device 110 to enter one or more payment instruments or other funding sources for storage in a digital wallet associated with a payment account (e.g., stored and/or serviced by service provider server 150) and/or engage in transaction processing with another entity, such as a merchant. In this regard, payment application 112 may correspond to specialized hardware and/or software utilized by a user of communication device 110 that initially provides an interface to permit the user to enter input and other data for payment instruments, for example, through an input device (e.g., touch screen with a graphical user interface, keypad/keyboard, mouse, etc.) and/or through a data capture device (e.g., scanner, camera, other optical device, etc.). Such information may be stored with service provider server 150 for use with an online digital wallet stored to an account for the user with service provider server 150, which may be utilized for transaction processing with another entity, such as a merchant associated with merchant device 140. In various embodiments, information for the account and/or digital wallet may also be stored to communication device 110 for use in an offline environment. The account accessible through payment application 112 may be used to initiate, receive, and/or process/complete transactions using services provided by service provider server 150. Once entered, the payment instruments may be communicated to service provider server 150 over network 170 by payment application 112 for establishment and/or maintenance/update of the account and/or entry into the digital wallet for the user. The user of communication device 110 may also enter discounts and/or benefits to payment application 112 for storage to the digital wallet and use during transaction processing. In various embodiments, recommendations displayed through service application 130 may also be processed and items associated with the recommendations may be purchased, for example, using payment application 112.

Payment application 112 may utilize one or more user interfaces, such as graphical user interfaces presented using an output display device of communication device 110, to enable the user associated with communication device 110 to perform transaction processing. In various embodiments, payment application 112 may correspond to a general browser application configured to retrieve, present, and communicate information over the Internet (e.g., utilize resources on the World Wide Web) or a private network. For example, payment application 112 may provide a web browser, which may send and receive information over network 170, including retrieving website information (e.g., a website for service provider server 150), presenting the website information to the user, and/or communicating information to the website, such as a location of the user. However, in other embodiments, payment application 112 may include a dedicated application of service provider server 150 or other entity (e.g., a merchant), which may be configured to assist in processing transactions. Payment application 112 may be utilized to select payment instrument(s) for use in providing payment for a purchase transaction, transfer, or other financial process, which may include purchase of an item in a recommendation received by communication device 110 and output through service application 130. As discussed herein payment application 112 may utilize a digital wallet stored to an account with a payment provider, such as service provider server 150, for example, through providing a token that identifies the account and authenticates the user for use of the account. Payment application 112 may use such a token during transaction processing to authenticate the user and complete transaction processing by providing the token, which may be encrypted and/or provided through a secure channel to authenticate the user and/or the user's digital wallet to service provider server 150 and allow for transaction processing and payment using the user's digital wallet. Payment application 112 may be utilized to view the results of payment, for example, using transaction histories, dispute resolution processes, and other post-transaction process.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 170, or other types of applications. Other applications 114 may also include additional communication applications where not provided by payment application 112, such as email, texting, voice, and IM applications that allow a user to send and receive emails, calls, texts, and other notifications through network 170. In various embodiments, other applications 114 may include financial applications, such as banking, online payments, money transfer, or other applications. Other applications 114 may also include other location detection applications, such as a mapping, compass, and/or GPS application, which may be used to determine a location for the user that is communicated to payment provider server 130. Other applications may include social networking applications and/or merchant applications. Other applications 114 may include device interfaces and other display modules that may receive input and/or output information. For example, other applications 114 may contain software programs, executable by a processor, including a graphical user interface (GUI) configured to provide an interface to the user.

Communication device 110 may further include database 116 stored to a transitory and/or non-transitory memory of communication device 110, which may store various applications and data and be utilized during execution of various modules of communication device 110. Thus, database 116 may include, for example, IDs such as operating system registry entries, cookies associated with payment application 112 and/or other applications 114, IDs associated with hardware of communication device 110, or other appropriate IDs, such as IDs used for payment/user/device authentication or identification. Database 116 may store information for an account for payment application 112 and/or communication device 110, such as identifiers, tokens, and/or authentication. Additionally, transaction information for a transaction between the user for communication device 110 and the merchant for merchant device 140 may be stored to database 116, including a selected payment instrument. Database 116 may include information for a digital wallet, including available payment instruments in the digital wallet. Moreover, received recommendations, rewards, and/or detected data may be stored to database 116.

Communication device 110 includes at least one communication module 118 adapted to communicate with merchant device 140 and/or service provider server 150. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Merchant device 140 may be maintained, for example, by a merchant that provides electronic sales to users through communication device 110 and/or service provider server 150. In this regard, merchant device 140 may include a device having processing applications, which may be configured to interact with communication device 110 to engage in transactions. Merchant device 140 may be implemented using any appropriate hardware and software configured for wired and/or wireless communication with communication device 110 and/or communication device 130. For example, in one embodiment, merchant device 140 may be implemented as a single or networked personal computer (PC), a smart phone, laptop computer, wearable computing device, and/or other types of computing devices at a merchant location capable of transmitting and/or receiving data. Although only one merchant device is shown, a plurality of merchant devices may function similarly.

Merchant device 140 of FIG. 1 contains a sales application 142, other applications 144, a database 146, and a communication module 148. Sales application 142 and other applications 144 may correspond to processes, procedures, and/or applications executable by a hardware processor, for example, a software program. In other embodiments, merchant device 140 may include additional or different modules having specialized hardware and/or software as required.

Sales application 142 may correspond to one or more processes to execute modules and associated specialized hardware of merchant device 140 that provide sales, checkout, and payment processes for a transaction to purchase one or more items for sale from the user, such as a merchant or seller, corresponding to merchant device 140. In this regard, sales application 142 may correspond to specialized hardware and/or software of merchant device 140 to provide a convenient interface to permit a merchant to enter, view, and/or edit items and/or services for purchase by the user associated with communication device 110. For example, sales application 142 may be implemented as an application having a user interface enabling the merchant to enter item information and request payment for a transaction on checkout/payment of one or more items/services. In certain embodiments, sales application 142 may correspond more generally to a web browser configured to view information available over the Internet or access a website corresponding to the merchant and/or an online marketplace utilized by the merchant. Thus, sales application 142 may provide item sales through an online marketplace using the website of the merchant or another service provider. Thus, the user of communication device 110 may initiate a transaction using sales application 142. Sales application 142 may correspond to one of the resources utilized by service provider server 150 when crowd-sourcing data, for example, to receive item data and/or additional environmental data associated with the merchant corresponding to merchant device 140. For example, sales application 142 may provide item pricing and/or inventory data, as well as waiting times at the merchant location, transaction histories, customer volume, and/or other data.

Once a payment amount is determined for a transaction for items to be purchased by user, sales application 142 may request payment from the user for transaction processing. Payment may be provided through a payment instrument, which may be associated with payment application 112 and/or communication device 110. The payment may be provided in response to a recommendation provided by service provider server 150, and may occur while the user is at the merchant location and/or prior to arrival by the user to the merchant location. The provided payment information may be communicated to merchant device 140, which may be used with the transaction and transaction information for approval. Service provider server 150 may process the transaction with the provided account and determine whether to approve or decline the transaction. Sales application 142 may then receive the results of the transaction processing, and complete the transaction with the user, for example, by providing the user the items for the transaction or declining the transaction where the user is not authenticated or the transaction is not authorized (e.g., insufficient funds, rejection of the transaction based on risk analysis by service provider server 150). A transaction history may then be generated by sales application 142.

Merchant device 140 includes other applications 144 as may be desired in particular embodiments to provide features to merchant device 140. For example, other applications 144 may include security applications for implementing client-side security features, programmatic client applications for interfacing with appropriate application programming interfaces (APIs) over network 170, or other types of applications. Other applications 144 may also include email, texting, voice and IM applications that allow a user to send and receive emails, calls, texts, and other notifications through network 170. In various embodiments, other applications 144 may include financial applications, such as banking, online payments, money transfer, or other applications associated with communication device 130. Other applications 144 may contain software programs, executable by a processor, including a graphical user interface (GUI) configured to provide an interface to the user.

Merchant device 140 may further include database 146 which may include, for example, identifiers such as operating system registry entries, cookies associated with sales application 142 and/or other applications 144, identifiers associated with hardware of merchant device 140, or other appropriate identifiers, such as identifiers used for payment/user/device authentication or identification. Identifiers in database 146 may be used by a payment/credit provider to associate merchant device 140 with a particular account maintained by the payment/credit provider. Database 146 may further include transaction information and/or results, including received payment instruments and/or user/merchant information.

Merchant device 140 includes at least one communication module 148 adapted to communicate with communication device 110 and/or service provider server 150. In various embodiments, communication module 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 150 may be maintained, for example, by a transaction processing service provider, which may include payment processing providers and other type of financial service providers. In this regard, service provider server 150 includes one or more processing applications which may be configured to interact with communication device 110, merchant device 140, and/or another device/server to facilitate transaction processing for financial transactions, as well as digital wallet use and transaction processing. In one example, service provider server 150 may be provided by PAYPAL®, Inc. of San Jose, Calif., USA. However, in other embodiments, service provider server 150 may be maintained by or include another financial entity.

Service provider server 150 of FIG. 1 includes intelligent offer application 160, a transaction processing application 152, other applications 154, a database 156, and a network interface component 158. Intelligent offer application 160, transaction processing application 152, and other applications 154 may correspond to executable processes, procedures, and/or applications with associated hardware. In other embodiments, service provider server 150 may include additional or different modules having specialized hardware and/or software as required.

Intelligent offer application 160 may correspond to one or more processes to execute modules and associated specialized hardware of service provider server 150 to receive an indication of an item of interest to a user, determine a recommendation for the user for the item based on optimizing one or more shopping preferences through crowd-sourced data, and transmit the recommendation through a communication platform determined based on known data for the user's platform usage and/or viewing schedule. In this regard, intelligent offer application 160 may correspond to specialized hardware and/or software to first access, receive, or determine a potential item of interest to purchase by a user, for example, through a shopping list of items of the user, past purchases, required purchases (e.g., an auxiliary purchase to a known item owned or ordered by the user such as batteries, a detected low requirement of an item such as gas detected by a vehicle device or home products detected by a smart home device, etc.), or other preference for purchase of an item by the user.

Intelligent offer application 160 may further access or receive item information for the item of interest and/or additional information, such as environmental factors associated with the item. The item information may correspond to pricing, availability, reviews, descriptions, or other information or parameter related to the item. The additional information associated with the item may correspond to information for a merchant selling the item, including traffic, weather, parking, and other types of conditions that may be associated with travel to, arrival at, and/or use of the merchant to purchase the item. Intelligent offer application 160 may generate a recommendation to purchase the item for the user based on the user's interest in the item, the item information, the additional information, and/or user preferences or data that indicates how, when, or where a user may purchase the item. Thus, the recommendation may include an offer for the item, including item sales prices, availability, or other information, as well as a time to purchase the item, location of purchase, route to the location, or other information useful to purchase and retrieve the item. Intelligent offer application 160 may request the data from multiple users, for example, by crowd-sourcing the information from multiple users. In this regard, intelligent offer application 160 may provide an incentive for one or more users to share data, including the crowd-sourced data. For example, rewards may be unlocked based on a number of times or an amount of sharing, based on a quality of sharing, or other parameter related to sharing of data. The rewards may correspond to offers and/or discounts with merchants, such as the merchant associated with merchant device 140, or may correspond to offers, discounts, and/or values provided by service provider server 150, such as a discount for a transaction, a stored value (e.g., a gift card), free or discounted services, or other reward. The rewards may also be tiered, and may be provided through a rewards system, game, or other service. Moreover, an augmented reality may present potential rewards that may be captured by providing data associated with an item corresponding to the reward. For example, the user may view a video output of a location where the potential reward is shown as a graphic in an augmented reality nearby or over an item. The user may then capture the necessary item data for the item to unlock the reward.

Intelligent offer application 160 may further determine a communication platform to transmit the recommendation to the user. For example, the communication platform may be selected based on viewed and/or used platforms by the user, including a currently in use application or platform. The platform may also be selected based on a schedule of the user and/or the recommendation may be presented through the platform based on the schedule, location, or other triggers. Once the platform is selected, the recommendation may be transmitted to the user at the appropriate time, location, or other trigger to transmit the recommendation. Moreover, intelligent offer application 160 may provide the recommendation with routing information, environmental information, and/or other information necessary to retrieve and purchase the item. The recommendation may be provided as a graphic in an augmented reality, and may be updated in real-time based on changing data, location of the user, or nearby proximity devices in communication with communication device 110. The recommendation may also include a purchase option for the item prior to or at the purchase location, which may be processed using transaction processing application 152.

Transaction processing application 152 may correspond to one or more processes to execute modules and associated specialized hardware of service provider server 150 to receive and/or transmit information from communication device 110 for establishing payment accounts, as well as processing and completing of one or more funding transactions initiated using the payment accounts, including use of a digital wallet associated with the payment account for a user associated with communication device 110. In this regard, transaction processing application 152 may correspond to specialized hardware and/or software to establish payment accounts and associated digital wallets, which may be utilized to send and receive payments and monetary transfers and engage in other financial transactions. The user associated with communication device 110 may establish a payment account with transaction processing application 152 by providing personal and/or financial information to service provider server 150 and selecting an account login, password, and other security information. In various embodiments, the financial information may include payment instruments, which may correspond to financial information for a user. The payment account may be used to send and receive payments. The payment account may be accessed and/or used through a browser application and/or dedicated payment application executed by communication device 110. Transaction processing application 152 may receive a payment request from communication device 110 and/or merchant device 140 for a transaction between the user and the merchant, which may include identifiers, tokens, or other data used for transaction processing. Transaction processing application 152 may provide payment to the merchant using the payment instrument, and may provide a transaction history to communication device 110, merchant device 140, or store the history with one or more accounts.

In various embodiments, service provider server 150 includes other applications 154 as may be desired in particular embodiments to provide features to service provider server 150. For example, other applications 154 may include security applications for implementing server-side security features, programmatic client applications for interfacing with appropriate application programming interfaces (APIs) over network 170, or other types of applications. Other applications 154 may contain software programs, executable by a processor, including a graphical user interface (GUI), configured to provide an interface to the user when accessing service provider server 150. In various embodiments where not provided by transaction processing application 152, other applications 154 may include connection and/or communication applications.

Additionally, service provider server 150 includes database 156. As previously discussed, one or more of a user or a merchant may establish a payment account including a digital wallet with service provider server 150. Accounts in database 156 may include entity information, such as name, address, birthdate, payment/funding information, additional user financial information, and/or other desired user data. An entity may link to their respective accounts through an account, user, merchant, and/or device ID, as well as a generated token, which may be provided to communication device 110 and/or merchant device 140 for use. Thus, when an ID is transmitted to service provider server 150, e.g., from communication device 110 and/or merchant device 140, an account belonging to the entity may be found. Additionally, received data and/or recommendations may be stored to database 156, as well as information useful for a rewards system.

In various embodiments, service provider server 150 includes at least one network interface component 158 adapted to communicate communication device 110 and/or merchant device 140 over network 170. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
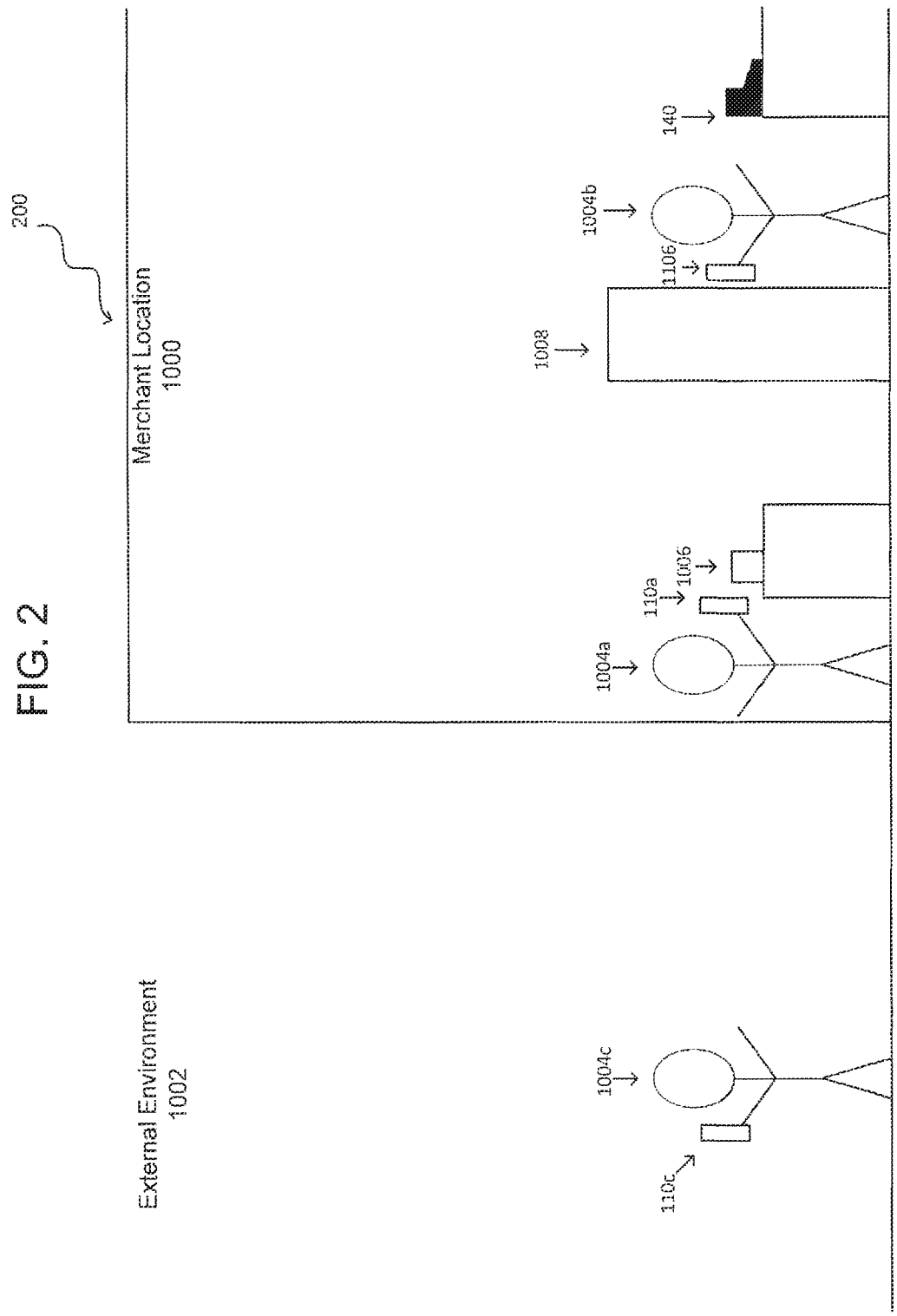
FIG. 2 is an exemplary user environment having multiple users accruing crowd-sourced data for use in providing a user with a particular recommendation or notification based on user information and preferred communication platforms, according to an embodiment.

FIG. 2 is an exemplary user environment having multiple users accruing crowd-sourced data for use in providing a user with a particular recommendation or notification based on user information and preferred communication platforms, according to an embodiment. Environment 200 includes a communication device 110*a*, a communication device 110*b*, and a communication device 110*c* corresponding generally to the described features, processes, and components of communication device 110 in system 100 of FIG. 1. In this regard, a user 1004a utilizing communication device 110a, a user 1004b utilizing communication device 110b, and a user 1004c utilizing communication device 110c may be location in environment 200 where communication devices 110a-c may capture and/or determine data that may be provided to a service provider. The service provider may therefore crowd-source the data from communication devices 110a-c and utilize the data to provide relevant recommendations to other users. Thus, communication devices 110a-c may execute one or more of the processes of input components 120 and/or service application 130 in system 100 to detected and process real-time data for environment 200.

Environment 200 includes a merchant location 1000 and an external environment 1002. At merchant location 1000, users 1004a and 1004b are browsing items and/or traveling through merchant location 1000. Users 1004a and 1004b may be in possession of communication devices 110a and 110b, respectively, where communication devices 110a and 110b may be utilized to capture data within merchant location 1000, for example, through one or more sensors or input components of a mobile phone or device. The data may be captured for an item 1006 or an item 1008. For example, user 1004a is shown as nearby item 1006 with communication device 110a, and may therefore capture data for a price, inventory, availability, sale, or other item data for item 1006. Similarly, user 1004b is nearby item 1008, which may be on a shelf with additional items, with communication device 110b and may capture data of similar items, group sales, stock, or other relevant item data. Communication devices 110a and 100b may also capture data of merchant location 1000, such as number of other users, noise level, checkout or item pickup line wait time or length (e.g., number of users in line), and/or environmental data of merchant location 1000 (e.g., temperature, humidity, etc.). The data may be captured continuously and/or provided to the server in real-time, so that the item data is current with the server and reflects changes in item data over time. The sensors may correspond to motion detection sensors, such as an accelerometer or gyroscope, or media capture devices, such as a camera. The sensors may also capture other data through other input components, including a microphone, touch screen interface, etc. In some embodiments, the data may be captured actively, for example, by the user entering data for items 1006 and 1008 or pointing a camera at something and taking an image or video recording of items 1006 and 1008. In other embodiments, the data may be captured by communication devices 110a and 110b passively, where users 1004a and 1004b, respectively, have allowed communication devices 110a and 110b to capture data. Additionally, other types of devices may also be utilized aside from mobile phones, such as wearable computing devices, tablet computers, biometric devices that capture biometric data, or other types of devices having input components capable of capturing one or more data points or values relevant to merchant location 1000 and/or items 1006 and/or 1008 within merchant location 1000.

The aforementioned data may be provided to a service provider for determination of data output to another user's communication device. The data provided to the other user's communication device may correspond to a notification that is generated, related, and/or dependent on the provided data from communication devices 110a and 110b. Additionally, the data may depend on further data captured by communication device 110c when user 1004c is in external environment 1002 at or nearby merchant location 1000. External environment 1002 may correspond to an outside location that is associated with merchant location 1000. For example, external environment 1002 may correspond to streets leading to merchant location 1000, a parking lot or structure for or associated with merchant location 1000, and/or nearby locations for merchant location 1000. Communication device 110c may capture environmental data for external environment 1002, which may include traffic data, portion filled or available spaces in a parking structure, weather information, safety issues, etc. In other embodiments, the environmental data may also be retrieved from data collected by or accrued by one or more servers or cloud computing architectures, such as a traffic service, weather services, etc. The environmental data may be transmitted to the service provider, and may be captured in real-time to provide accurate current data to the service provider for use in determining the output data (e.g., an item recommendation or purchase notification) for the other user's communication device.

Figure 3:
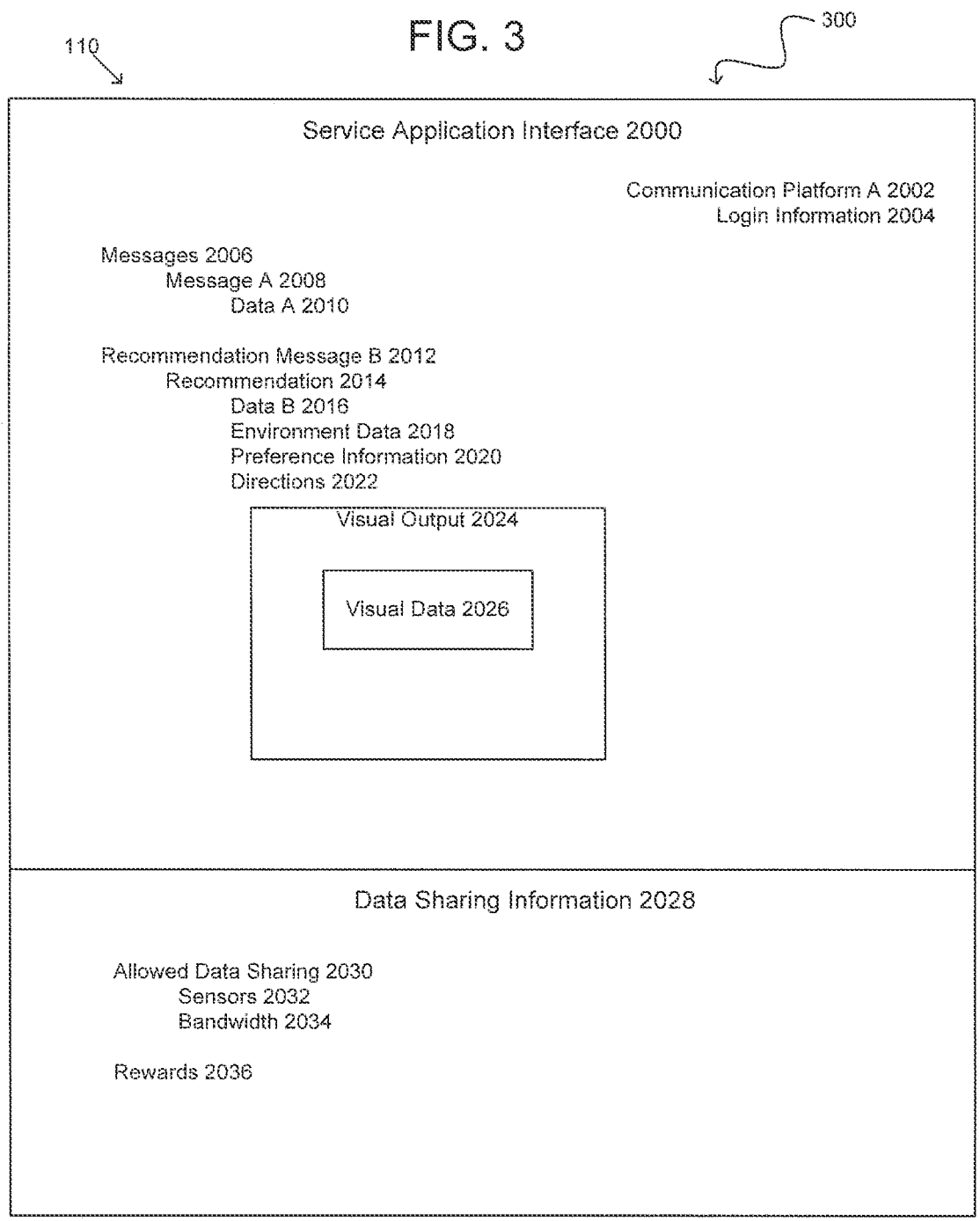
FIG. 3 is an exemplary user interface displaying data specific to a user associated with a device displaying the user interface, where the data is crowd-sourced from multiple other devices, according to an embodiment.

FIG. 3 is an exemplary user interface displaying data specific to a user associated with a device displaying the user interface, where the data is crowd-sourced from multiple other devices, according to an embodiment. FIG. 3 includes communication device 110 discussed in reference to system 100 of FIG. 1.

Communication device 110 executes an application, such as service application 110, that may correspond generally to the specialized hardware components and/or software processes described in reference to FIG. 1. In this regard, communication device 110 displays a service application interface 2000, which may output data to a user based on the user's interest in an item, as well as current data for the user. The data may correspond to a recommendation or notification for the item, which may be updated in real-time to reflect changes to the user's interest in an item and their current data, as well as changing item data (e.g., sales inventory, price, etc.). Service application interface 2000 may therefore provide a communication platform A 2002 that may be used to receive communications and output the communications to the user. Communication platform A 2002 may require login information 2004 for the user to utilize the platform, which may be utilized with authentication information to authenticate the user and allow the user to utilize communication platform A 2002 and receive/view messages and recommendation.

Service application interface 2000 further includes messages 2006, which correspond to a messaging center within the user interface (UI) of service application interface 2000. The UI may be output through an output component of communication device 110, such as a display interface, and may allow the user to view and interact with messages 2006. Messages 2006 therefore includes a message A 2008 having data A 2010, such as an instant message, email, social networking post or message, text message (e.g., SMS/MMS), or other data transfer to the user through communication platform A 2002. Messages 2006 further includes a recommendation message B 2012 from a service provider that is automatically (e.g., without user input) generated by the service provider based on user information and/or item information. Recommendation message B 2012 may include a recommendation 2014 having data B 2016 (e.g., item purchase and/or location information), environment data 2018 associated with the item/location information (e.g., for or nearby a merchant), preference information 2020 that caused generation of recommendation message B 2012 (e.g., the user's item interest), and directions 2022 to the item.

Directions 2022 may be associated with a visual output 2024, including a map for visual data 2026. In other embodiments, visual data 2026 of visual output 2024 may correspond to an augmented reality type output configured to overlay directions 2022 onto captured media by communication device 110.

Communication device 110 may further include data sharing information 2028 in an interface of service application interface 2000 and/or associated with service application interface 2000 (e.g., another interface related to service application interface 2000). Data sharing information 2028 may include information for sharing data captured by communication device 110 with a service provider for generation of recommendations for the user and/or other users. In this regard, data sharing information 2028 includes allowed data sharing 2030, which may be associated with sensors 2032 and/or bandwidth 2034. Sensors 2032 may indicate the device sensors and/or components that are used to capture data transmitted to the service provider, such as usage allowances and restrictions on device components to capture data. Bandwidth 2034 may also indicate an allowable amount of data transfer, for example, to limit an amount or frequency of data transfer. Bandwidth 2034 may be dependent on a connection of communication device 110, for example, by limiting all or a portion of data sharing on a mobile plan while allowing certain or all data sharing while on a WiFi network or other network having less restrictive or costly data sharing requirements. Additionally, the user may accrue rewards 2036 (e.g., item purchase benefits, discounts, etc.) by virtue of allowed data sharing 2030, which may be accessible and used with one or more transactions.

Figure 4:
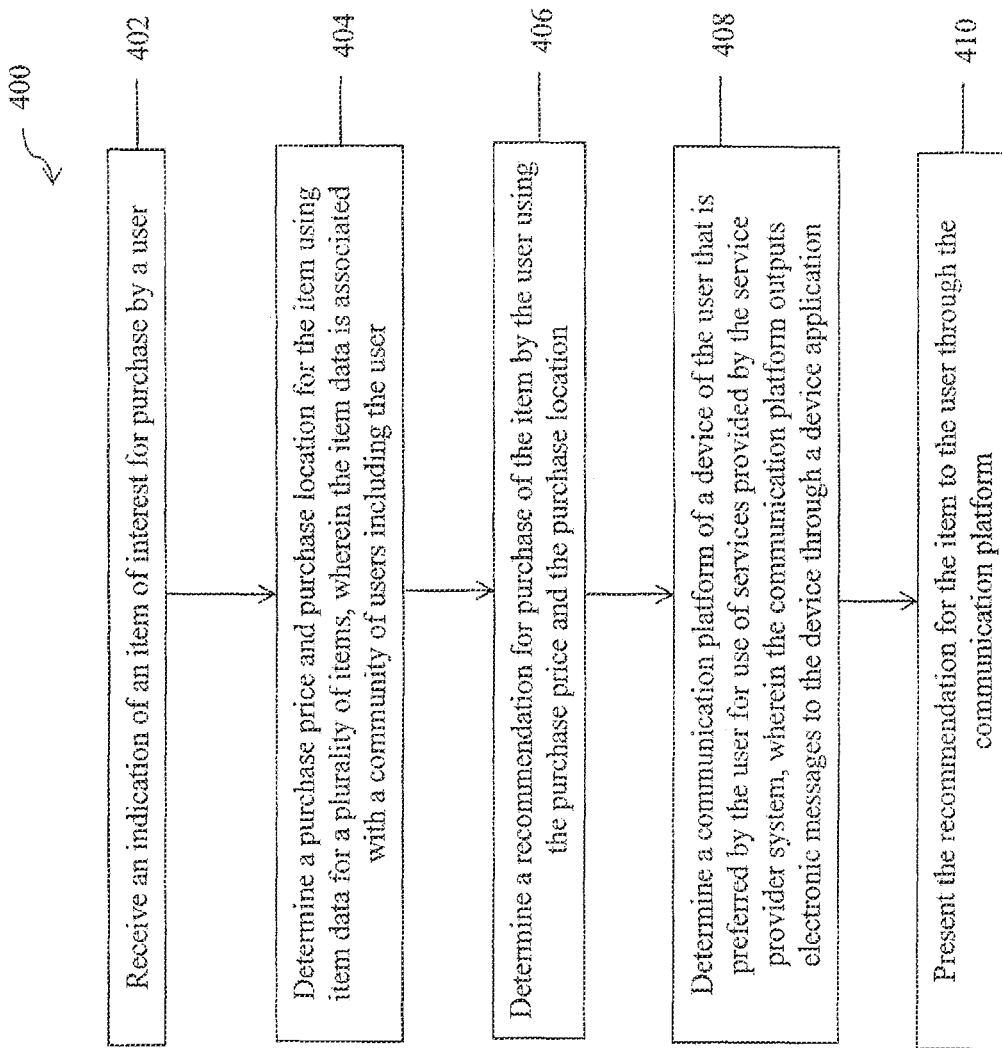
FIG. 4 is an exemplary process flowchart for user specific data distribution of crowd-sourced data, according to an embodiment.

FIG. 4 is an exemplary process flowchart for telecommunication transaction processing and fraud analysis, according to an embodiment. Note that one or more steps, processes, and methods described herein may be omitted, performed in a different sequence, or combined as desired or appropriate.

At step 402 of flowchart 400, an indication of an item of interest for purchase by a user is received. A purchase price and purchase location for purchase of the item by the user is determined using item data for a plurality of items, wherein the item data is associated with a community of users including the user, at step 404 of flowchart 400. The item data may be crowd-sourced from the community of users using devices associated with the community of users. The item data may comprise prices of the plurality of items from at least one merchant, availability of the plurality of items from the at least one merchant, or merchant locations for the plurality of items from the at least one merchant. The crowd sourced data may be determined by the devices using a device sensor, a GPS locator, a user input mechanism, application data for an application, or captured media.

The purchase price and the purchase location may be further determined based on user data for the user, for example, the user data may comprise a location of the user, past shopping by the user, purchase preferences of the user, a schedule of the user, or a required purchase by the user. Moreover, additional data associated with an environment associated with a merchant location for a merchant selling at least one of the plurality of items may be used to determine the purchase price and the purchase location. The item data may be further determined using a networked device or networked sensor associated with a merchant location for a merchant selling at least one of the plurality of items.

A recommendation for the item is determined using the purchase price and the purchase location, at step 406 of flowchart 400. At step 408 of flowchart 400, a communication platform of a device of the user that is preferred by the user for use of services provided by the service provider system is determined, wherein the communication platform outputs electronic messages to the device through a device application. The communication platform may be determined using past platform usages by the user, application data for a device of the user, a schedule of the user, or actions by the user using the device. At step 410 of flowchart 400, the recommendation for the item is presented to the user through the communication platform. In various embodiments, a route to the purchase location may be determined, wherein the recommendation comprises the route. The route may be displayed as an augmented reality overlay for a data capture device of a device for the user. Additionally, the item data may be received in real-time from the community of users, wherein the recommendation is updated in real-time on a device of the user based on item data. Thus, a reward system may be provided to the community of users, wherein the rewards system provides a reward to individual users in the community of users based on data sharing by each of the individual users. Additionally, the reward system may comprise a tiered reward system, wherein tiers in the tiered reward system are unlocked based on an amount of the data sharing.

Figure 5:
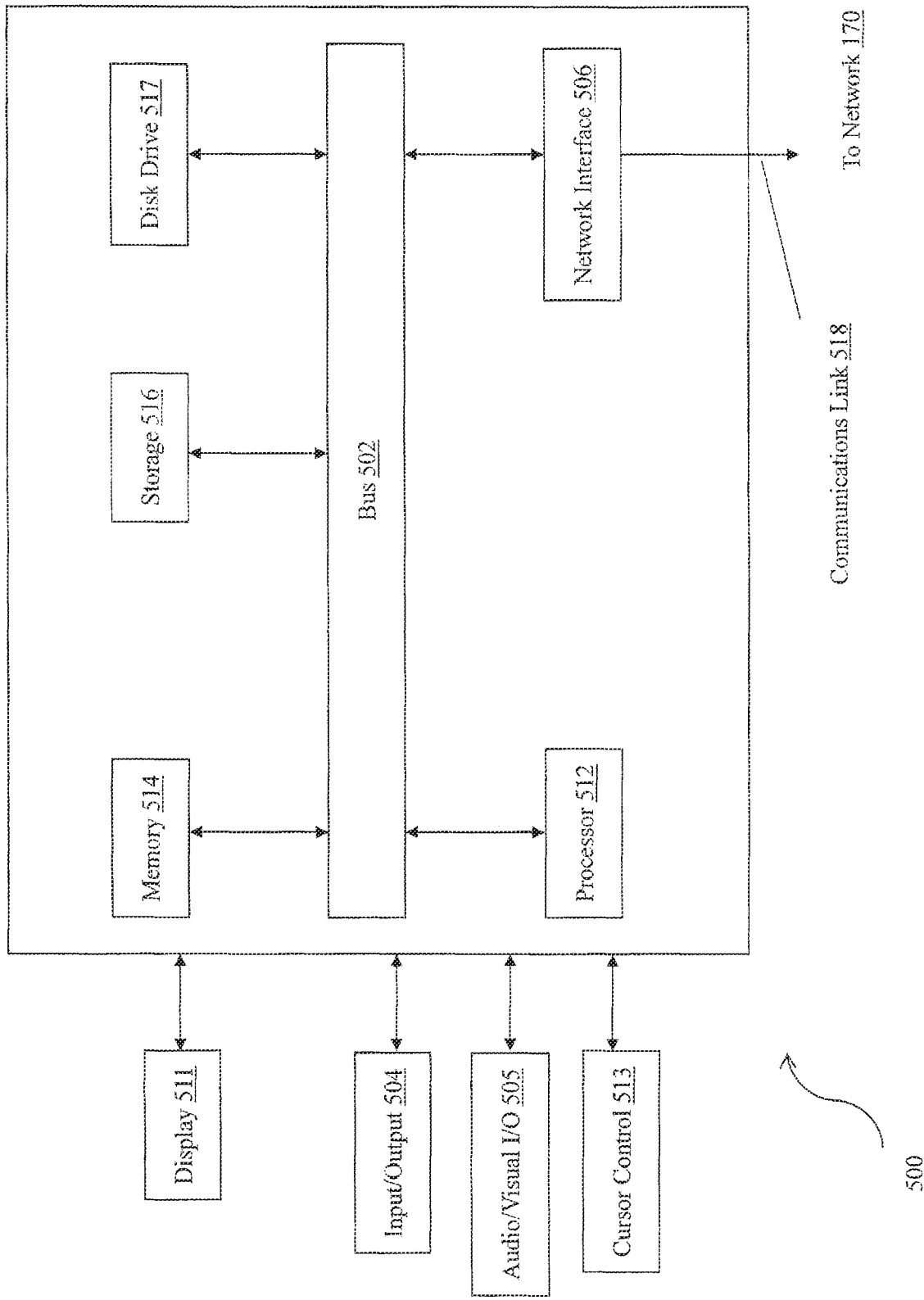
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
one or more processors; and
one or more machine-readable storage media having instructions stored thereon that, in response to being executed by the one or more processors, cause the system to perform operations comprising:
receiving, by a data detection component, an indication of an item of interest by a user of a user device;
determining data features associated with the item of interest;
in response to the determining, transmitting a request for information on the item of interest based in part on the data features, wherein the request is transmitted to a plurality of data detection components associated with a plurality of locations having the item of interest;
receiving information on the item of interest based on the transmitting;
correlating the information with a user activity parameter detected for the user;
determining a communication platform for a presentation of recommendations for the item of interest based on interactions with a past communication platform utilized by the user device and the user activity parameter;
providing a component layer for the presentation on the user device via the communication platform;
presenting the recommendations on the communication platform via the component layer based on the item of interest and the correlating;
generating a secure digital token for a digital wallet associated with the user using a tokenization service, wherein the secure digital token substitutes a sensitive identifier for the digital wallet for another identifier; and
providing the secure digital token to the user device for a transaction associated with the recommendations.

2. The system of claim 1, wherein the request is further transmitted to devices wirelessly connected with the user device.

3. The system of claim 1, wherein the request includes a crowdsourced request for the information from wirelessly connected devices associated with the plurality of locations.

4. The system of claim 1, wherein the operations further comprise:
transmitting a request for user preferences to the user of the user device; and
accessing environmental information associated with the user device,
wherein the presenting the recommendations is further based on the user preferences and the environmental information.

5. The system of claim 1, wherein the recommendations include one or more items having at least one of a cost, a location, or an availability matching the item of interest based on the related information.

6. The system of claim 1, wherein the presenting is provided through an augmented reality.

7. The system of claim 4, wherein the environmental information includes at least one of a device location, traffic information, or sensor device information.

8. A method comprising:
receiving, by a data detection component, an indication of an item of interest by a user of a user device;
determining data features associated with the item of interest;
in response to the determining, transmitting a request for information on the item of interest based in part on the data features, wherein the request is transmitted to a plurality of data detection components associated with a plurality of locations having the item of interest;
receiving information on the item of interest based on the transmitting;
correlating the information with a user activity parameter detected for the user;
determining a communication platform for a presentation of recommendations for the item of interest based on past interactions with the communication platform utilized by the user device and the user activity parameter;
providing a component layer for the presentation on the user device via the communication platform;
presenting the recommendations on the communication platform via the component layer based on the item of interest and the correlating;
generating a secure digital token for a digital wallet associated with the user using a tokenization service, wherein the secure digital token substitutes an identifier for the digital wallet with another identifier; and
providing the secure digital token to the user device for a transaction associated with the recommendations.

9. The method of claim 8, wherein the request is further transmitted to devices wirelessly connected with the user device.

10. The method of claim 8, wherein the request includes a crowdsourced request for the information from wirelessly connected devices associated with the plurality of locations.

11. The method of claim 8, further comprising:
transmitting a request for user preferences to the user of the user device; and
accessing environmental information associated with the user device,
wherein the presenting the recommendations is further based on the user preferences and the environmental information.

12. The method of claim 8, wherein the recommendations includes one or more items having at least one of a cost, a location, or an availability matching the item of interest based on the information.

13. The method of claim 8, wherein the presenting is provided through an augmented reality.

14. The method of claim 11, wherein the environmental information includes at least one of a device location, traffic information, or sensor device information.

15. A non-transitory machine-readable medium having stored thereon machine-readable instructions executable to cause a machine to perform operations comprising:
receiving, by a data detection component, an indication of an item of interest by a user of a user device;
determining data features associated with the item of interest;
in response to the determining, transmitting a request for information on the item of interest based in part on the data features, wherein the request is transmitted to a plurality of data detection components associated with a plurality locations having the item of interest;
receiving information on the item of interest based on the request;
correlating the information with a user activity parameter detected for the user;
determining a communication platform for a presentation of the relevant recommendations to the item of interest based on past interactions with the communication platform utilized by the user device and the user activity parameter;
providing a component layer for the presentation on the user device via the communication platform;
presenting the recommendations on the communication platform via the component layer based on the item of interest and the correlating;
generating a secure digital token for a digital wallet associated with the user using a tokenization service, wherein the secure digital token substitutes a first type of identifier for the digital wallet for a second type of identifier; and
providing the secure digital token to the user device for a transaction associated with the recommendations.

16. The non-transitory machine-readable medium of claim 15, wherein the request is further transmitted to devices wirelessly connected with the user device.

17. The non-transitory machine-readable medium of claim 15, wherein the request includes a crowdsourced request for the information from wirelessly connected devices associated with the plurality of locations.

18. The non-transitory machine-readable medium of claim 15, wherein the recommendations include one or more items having at least one of a cost, a location, or an availability matching the item of interest based on the related information.

19. The non-transitory machine-readable medium of claim 18, wherein the presenting is provided through an augmented reality.

20. The non-transitory machine-readable medium of claim 15, wherein environmental information is received in the indication of the item of interest and includes at least one of a device location, traffic information, or sensor device information.

* * * * *

UNITED STATES PATENT AND TRADEMARK OFFICE
CERTIFICATE OF CORRECTION

PATENT NO. : 11,776,040 B2
APPLICATION NO. : 17/317186
DATED : October 3, 2023
INVENTOR(S) : Akshay Sanjeevaiah Krishnaiah It is certified that error appears in the above-identified patent and that said Letters Patent is hereby corrected as shown below:

In the Claims

Claim 15, Column 24, Line 12, change "a plurality locations having" to --a plurality of locations having--.

Signed and Sealed this
Twenty-eighth Day of November, 2023

Katherine Kelly Vidal
*Director of the United States Patent and Trademark Office*